(12) United States Patent
Dong

(10) Patent No.: US 8,551,297 B2
(45) Date of Patent: Oct. 8, 2013

(54) PROCESS FOR EXTRACTIVE DISTILLATION

(76) Inventor: Baojun Dong, Shanghai (CN)

(*) Notice: Subject to any disclaimer, the term of this patent is extended or adjusted under 35 U.S.C. 154(b) by 1223 days.

(21) Appl. No.: 12/186,506

(22) Filed: Aug. 5, 2008

(65) Prior Publication Data

US 2010/0025220 A1    Feb. 4, 2010

(30) Foreign Application Priority Data

Aug. 4, 2008    (CN) .......................... 2008 1 0117683

(51) Int. Cl.
*B01D 3/34*    (2006.01)

(52) U.S. Cl.
USPC ............................................................ 203/50

(58) Field of Classification Search
USPC .............................. 203/50, 32; 585/614, 615
See application file for complete search history.

(56) References Cited

U.S. PATENT DOCUMENTS

| | | | | | |
|---|---|---|---|---|---|
| 2,341,812 | A | * | 2/1944 | Pierotti et al. ................... | 203/65 |
| 2,365,912 | A | * | 12/1944 | Souders, Jr. ..................... | 203/52 |
| 2,623,844 | A | * | 12/1952 | Scheeline ........................ | 203/58 |
| 2,971,036 | A | * | 2/1961 | James ............................. | 203/29 |
| 3,050,450 | A | * | 8/1962 | Kleiss et al. ................... | 202/160 |
| 3,681,202 | A | * | 8/1972 | Funkhouser .................... | 203/53 |
| 3,860,496 | A | * | 1/1975 | Ginnasi et al. ................. | 203/28 |
| 4,053,369 | A | * | 10/1977 | Cines .............................. | 203/52 |
| 4,081,332 | A | * | 3/1978 | Hein ............................... | 203/51 |
| 4,128,457 | A | * | 12/1978 | Barba et al. .................... | 203/29 |
| 4,134,795 | A | * | 1/1979 | Howat, III ...................... | 203/53 |
| 5,679,241 | A | * | 10/1997 | Stanley et al. ................. | 208/92 |
| 2005/0154246 | A1 | * | 7/2005 | Adrian et al. ................. | 585/862 |
| 2006/0241329 | A1 | * | 10/2006 | Heida ............................ | 585/809 |

OTHER PUBLICATIONS

Buell, C., Boatright, R., "Furfural Extractive Distillation", Industrial and Engineering Chemistry, vol. 39 No. 6, pp. 695-705, (c) 1947.*

* cited by examiner

*Primary Examiner* — Robert A Hopkins

(57) ABSTRACT

A process for extractive distillation, including: feeding a solvent to an extractive distillation column via a solvent feeding inlet, wherein the solvent has a feeding temperature 3.5~22.5° C. higher than a top temperature of the extractive distillation column; feeding a mixture comprising a light component and a heavy component to the extractive distillation column via a mixture feeding inlet, wherein the light and heavy components are according to the volatility after adding the solvent, wherein the mixture is liquid, and the mixture feeding inlet is lower than the solvent feeding inlet; condensing a vapor generated by the mixture in an upper portion of the extractive distillation column to obtain the light component; and separating the solvent in a lower portion of the extractive distillation column to obtain the heavy component.

20 Claims, No Drawings

PROCESS FOR EXTRACTIVE DISTILLATION

BACKGROUND OF THE PRESENT INVENTION

1. Field of Invention

The present invention relates to a process for extractive distillation, and more particularly to a process for extractive distillation which reduces a solvent ratio by optimizing the temperature of solvent and the way of feeding in an existing extractive distillation column.

2. Description of Related Arts

Extractive distillation is utilized widely to separate an azeotrope or a liquid mixture consisting of several individual components having close boiling points in the chemical industries. The extractive distillation ordinarily feeds one or two solvents, which are soluble in the azeotrope or the liquid mixture, into the extractive distillation column to change or increase the relative volatility between the components to be separated, so as to separate components having close boiling points. As for the azeotrope, the solvent destroys the azeotrope system between the components, and makes the azeotropic point disappear, so as to separate the components. According to the way of feeding, the extractive distillation can be classed into continuous extractive distillation and batch extractive distillation. The continuous extractive distillation is more suitable to deal with a large amount of the azeotrope or the liquid mixture.

The solvents which have high boiling points and low volatility, do not form an azeotrope with the liquid mixture, and are hard to vaporize during distillation. The solvents are often fed from an upper portion of an extractive distillation column, while the mixture is fed from a lower portion thereof. In traditional extractive distillation, the mixture is saturated vapor when feeding, so as to make sure that the solvent concentration of the extractive distillation segment and the extractive stripping segment in the column is close, which helps separation of the components. However, the gas-phase feeding may cause serious local backmixing to the composition of components on the trays next to the feeding tray, and reduce separating effect of the extractive distillation column.

In the extractive distillation, the concentration of the solvent in the column mainly affects the relative volatility of the components and the separating efficiency. According to the relative art, the concentration is ordinarily 65%~70%. The concentration of the solvent in the column is mainly determined by the solvent ratio and the reflux ratio (including the external reflux ratio and the internal reflux ratio). According to the traditional theory of extractive distillation, the solvent flowing downwardly contacts and absorbs the heavy components in the rising vapor feed, and leaves the light components rising up to be separated in the upper portion of the column. To enhance the contacting and absorbing effect, the column should provide a great deal of rising vapor feed, so a high column temperature or plenty of recycled feed is needed to maintain the concentration of solvent.

There was feeding the mixture as liquid. Parameters and structure of the extractive distillation column are adjusted and changed to cooperate with the way of feeding mixture. However, the adjusting and changing is according to the traditional theory, and still bases on providing a great deal of rising vapor, therefore can not reach an optimized condition and reduce the solvent ratio efficiently. Particularly, there is no previous practice that feeding mixture as saturated liquid in extractive distillation.

The temperature of the extractive distillation column is gradually increasing from top to bottom, and due to the high solvent ratio, the sensible heat of the solvent can not be ignored in the extractive distillation column. Ordinarily, the traditional theory requires that the feeding solvent has the same temperature as the liquid on the solvent feeding tray. Because if the temperature of the solvent is too high when feeding into the column, the rising vapor will be too much and break the liquid-gas balance in the column, and the separating effect will be affected. As a result, the external reflux ratio should be increased to maintain the liquid-gas balance, and a large solvent ratio is required to maintain the concentration of the solvent. For example, when the feeding temperature of the solvent is up to 64° C. in the first extractive distillation column of a C5 separation device in China, the solvent ratio is 8.6 wt/wt. It is obvious that merely increasing the feeding temperature of the solvent can not reduce the solvent ratio.

Accordingly, because the feeding solvent has the same temperature as the liquid on the solvent feeding tray, the temperature of the solvent increases as flowing down, and the solvent absorbs heat from the rising vapor feed, which causes that more vapor feed condenses down to increase the internal reflux ratio. In the circumstances, the solvent is diluted and the concentration thereof is reduced to affect the separating effect. To solve the problem, the prior art increases the solvent ratio to maintain the concentration of the solvent. For example, the solvent ratio of the first extractive distillation column of a butadiene extraction device is about 8 wt/wt, and the designed solvent ratios of the first and the second extractive distillation column of a C5 separation device in China are up to 8.8 wt/wt and 9.9 wt/wt respectively. The high solvent ratio reduces the efficiency of the trays and the column, and counteracts the effect of adding solvent which raises the relative volatility of the components and decreases the trays needed. As a result, the extractive distillation column costs more money and energy to build and operate.

SUMMARY OF THE PRESENT INVENTION

An object of the present invention is to provide a process for extractive distillation, which greatly reduces the solvent ratio in an extractive distillation column, so as to reduce the cost of solvent and energy, increase heat efficiency of the extractive distillation column, and maximize the separating capability of the extractive distillation column.

Another object of the present invention is to provide a process for extractive distillation, which reduces the solvent ratio in the extractive distillation column by merely changing and optimizing parameters thereof, and utilizing the existing equipments, in such a manner that no additional cost or complicated structure is required to achieve the above object.

Another object of the present invention is to provide a process for extractive distillation, which improves separating effect of the extractive distillation column, and the height of the feeding tray can be lowered to increase the number of trays in the extractive distillation segment and increase separating effect of the extractive distillation segment.

Another object of the present invention is to provide a process for extractive distillation, which does not need high column temperature or plenty of recycled feed, so as to greatly reduce the gas-phase load of the extractive distillation column, and especially reduce the load of the extractive stripping segment. Therefore, the concentration of solvent in the extractive stripping segment is assured, and the efficiency of stripping and condensing the extraction raffinate is increased, which has great effect on reducing the solvent needed and increasing the treating capability of the column.

Another object of the present invention is to provide a process for extractive distillation, wherein the temperature difference in the extractive distillation column is decreased, and the heat needed to increase the temperature of the solvent as flowing down is decreased, too. The method reduces energy consumed, avoids the problems brought by high temperature, and raises the product yield of the feed.

Another object of the present invention is to provide a process for extractive distillation, which can be applied to various existing extractive distillation devices to reduce the solvent ratio and increase the treating capability thereof by merely changing and optimizing the parameters.

Accordingly, in order to accomplish the above object, the present invention provides a process for extractive distillation, comprising:

feeding a solvent to an extractive distillation column via a solvent feeding inlet thereof, wherein the solvent has a feeding temperature 3.5~22.5° C. higher than a top temperature of the extractive distillation column;

feeding a mixture comprising a light component and a heavy component to the extractive distillation column via a mixture feeding inlet thereof, wherein the mixture is liquid, and the mixture feeding inlet is lower than the solvent feeding inlet;

condensing a vapor generated by the mixture in an upper portion of the extractive distillation column to obtain the light component; and separating the solvent in a lower portion of the extractive distillation column to obtain the heavy component.

Therefore the present invention increases the feeding temperature of the solvent and feeds the mixture as liquid instead of vapor, so that the solvent mixes with the mixture substantially and changes a relative volatility between the components, so as to enhance a separating effect, and the solvent having higher temperature absorbs less heat as flowing down, while the mixture generates less rising vapor, so as to decrease an internal reflux ratio in the extractive distillation column and avoid that the high temperature breaks a liquid-gas balance in the extractive distillation column. Accordingly, the solvent ratio for keeping a concentration of the solvent is reduced.

These and other objectives, features, and advantages of the present invention will become apparent from the following detailed description, and the appended claims.

DETAILED DESCRIPTION OF THE PREFERRED EMBODIMENT

The present invention provides a process for extractive distillation, comprising:

feeding a solvent to an extractive distillation column via a solvent feeding inlet, wherein the solvent has a feeding temperature 3.5~22.5° C. higher than a top temperature of the extractive distillation column;

feeding a mixture comprising a light component and a heavy component to the extractive distillation column via a mixture feeding inlet thereof, wherein the mixture is liquid, and the mixture feeding inlet is lower than the solvent feeding inlet;

condensing a vapor generated by the mixture in an upper portion of the extractive distillation column to obtain the light component in the vapor; and separating the solvent in a lower portion of the extractive distillation column to obtain the heavy component.

The feeding temperature of the solvent is increased up to 3~22° C. higher than a temperature of liquid on a solvent feeding tray on which the solvent enters into the extractive distillation column (column for short below). Because the temperature of liquid on the solvent feeding tray is a theoretic value calculated, and not easy to measure precisely, the present invention chooses the top temperature of the column to characterize the theoretic value instead. The top temperature is a temperature of a top of the extractive distillation column. Ordinarily, a difference of the top temperature and the temperature of liquid on the solvent feeding tray is less than 0.5° C. Accordingly, the present invention can be expressed that the feeding temperature of the solvent is 3.5~22.5° C. higher than the top temperature of the column.

The mixture is liquid when feeding into the column for separating. The mixture comprises the light component and the heavy component which have close boiling points or even form an azeotrope. The mixture mixes with the solvent substantially, and a relative volatility between the components is changed to facilitate separating.

According to the traditional theory, the solvent flowing downwardly contacts with the rising vapor mixture, absorbs the heavy component therein, and leaves the light component rising to be separated. Accordingly, the column must provide plenty of rising vapor, so the mixture is traditionally saturated vapor to contact with the flowing solvent substantially. Further, because of the plenty of rising vapor mixture, the feeding temperature of the solvent can not be too high. A high temperature of the solvent may cause that the rising vapor becomes too much and a liquid-gas balance in the column will be broken. If raising the feeding temperature of the solvent, an external reflux ratio and the solvent ratio should be increased to maintain the liquid-gas balance. The traditional theory ordinarily requires that the feeding temperature of the solvent is as same as the temperature of liquid on the solvent feeding inlet. However, a temperature of the solvent increases as flowing downwardly, and the solvent absorbs a great deal of heat from the rising vapor mixture to make much rising vapor mixture condense down. The condensed vapor mixture increases an internal reflux ratio of the column, and dilutes the solvent. To maintain a concentration of the solvent at a reasonable level, ordinarily 65%~70%, more solvent should be fed. According to the prior art, a solvent ratio is often up to 8 wt/wt.

The present invention discloses a process for extractive distillation according to a new theory, which reduces the solvent ratio to exceed a limit value according to the traditional theory. The present invention bases on the new theory that the extractive distillation column is not similar to an absorption column, but a distillation column with solvent. In the absorption column according to the traditional theory, the flowing solvent contacts with the rising vapor mixture and absorbs the components therein, while in the extractive distillation column according to the present invention, the solvent mixes with the mixture substantially to change the relative volatility between the components, then the light component rises to be separated. So there is no need for plenty of rising vapor mixture to contact with the solvent flowing down, but just let the solvent mix substantially with the liquid mixture to change the relative volatility between the components therein. Accordingly, the mixture can be liquid, and the feeding temperature of the solvent can be properly increased to reduce the internal reflux ratio in the column. So the concentration of the solvent can be maintained by less solvent, and the solvent ratio is reduced to a very low level. Plenty of experiments and continuous practice prove the new theory to be correct and effective, and give out detailed and operative parameters to achieve the object with the existing equipments and devices.

According to the prior art, ways of feeding mixture to a distillation column comprise: feeding as cool liquid, feeding as saturated liquid, feeding as liquid and gas mixture, feeding as saturated vapor, and feeding as overheated vapor. The way of feeding mixture determines designing of number of trays in the distillation column, separating effect, energy consumed and etc. Parameters and structure of the distillation column are adjusted and changed to cooperate with the way of feeding mixture. However, the adjusting and changing is according to the traditional theory, and still bases on providing a great deal of rising vapor, therefore can not reach an optimized condition and reduce the solvent ratio efficiently. Particularly, there is no previous practice that feeding mixture as saturated liquid in extractive distillation.

Because feeding the mixture as vapor causes serious local backmixing to a composition of the components on trays next to the mixture feeding inlet, and reduces a separating effect of the extractive distillation column, feeding as liquid should be preferable to avoid the foregoing drawbacks. And, only when the liquid mixture mixes substantially with the solvent, the relative volatility between the components changes evidently to facilitate separating. What's more, feeding the mixture as liquid can decrease a temperature difference in the column to enhance a heat efficiency thereof. Because a temperature of the column is ordinarily gradually increasing from top to bottom, and the feeding temperature of liquid is ordinarily lower than the saturated vapor, increasing the feeding temperature of the solvent and feeding the mixture as liquid can reduce the temperature difference in the column from top to bottom.

The solvent is fed to the column with several recycling trays between the solvent feeding inlet and a top of the column. The recycling trays recycle the solvent and further purify the vapor. The vapor is transported out of the column and condensed to obtain the light component. The light component is not pure ordinarily. A part of the light component is fed back to the column as an external reflux. The solvent in the lower portion of the column is transported out of the column to separate the heavy component, and recycle the solvent back to the column to reuse the solvent.

Particularly, the process for extractive distillation further comprises:

recycling the solvent from the lower portion of the extractive distillation column, wherein the solvent is recycled and fed to the extractive distillation column via the solvent feeding inlet; and recycling a part of the light component in the upper portion of the extractive distillation column to form an external reflux.

According to the present invention, the mixture is preferably embodied as saturated liquid. Because if the feeding temperature of the mixture is too low, the mixture will absorb much heat from the rising vapor and increase the internal reflux ratio. Increasing the feeding temperature of the mixture to saturated liquid can reduce the internal reflux ratio, prevent the solvent from being diluted to reduce the relative volatility between the components, and further reduce the solvent ratio.

Further, according to the present invention, the feeding temperature of the solvent is preferably embodied as 3.5~18.5° C. higher than the top temperature of the extractive distillation column.

Further, according to the present invention, the feeding temperature of the solvent is more preferably embodied as 7.5~18.5° C. higher than the top temperature of the extractive distillation column.

Particularly, according to the present invention, the process for extractive distillation adapts to various existing extractive distillation devices. By plenty of experiments and continuous practice, the present invention provides detailed and operative parameters for various existing extractive distillation devices.

Particularly, the extractive distillation column is a first extractive distillation column of a butadiene extraction device, wherein the feeding temperature of the solvent is most preferably embodied as 10.5~15.5° C. higher than the top temperature of the extractive distillation column.

Particularly, the extractive distillation column is a first extractive distillation column of a C5 separation device, wherein the feeding temperature of the solvent is most preferably embodied as 9.5~14.5° C. higher than the top temperature of the extractive distillation column.

Particularly, the extractive distillation column is a second extractive distillation column of a C5 separation device, wherein the feeding temperature of the solvent is most preferably embodied as 11.5~16.5° C. higher than the top temperature of the extractive distillation column.

According to the prior art, the extractive distillation column is ordinarily utilized to separate 1,3-butadiene, C5, aromatics, and cyclohexane, etc., and the solvents in common use comprise acetonitrile (CAN), N-Methyl-Pyrrolidone (NMP), dimethylformamide (DMF). The present invention is capable of utilizing the foregoing solvents and separating the mixture efficiently.

Further, feeding the mixture as saturated liquid can improve the separating effect of the column, and decrease theoretic number of trays needed. Particularly, to employ the existing equipments, the mixture feeding inlet is moved down, so the mixture is fed from a lower position to increase trays in an extractive distillation segment of the column, and increase the separating effect of the extractive distillation segment.

The existing extractive distillation columns, which are fed with the mixture as saturated vapor, have a large diameter of a feeding pipe. If feeding the mixture as liquid, a flowing speed of the mixture in the feeding pipe is decreased evidently, especially at the mixture feeding inlet. The low flowing speed of the mixture affects mixing of the solvent and the mixture, and reduces a tray efficiency of the trays in the column. To increase the flowing speed of the mixture, the extractive distillation column preferably has a feeding pipe whose diameter is decreased to a predetermined value. Referring to embodiment 1, the diameter of the feeding pipe is over 250 mm as feeding vapor, and is under 100 mm as feeding liquid by calculating.

Particularly, the extractive distillation column according to the present invention is especially suitable to treating a great deal of mixture. The extractive distillation column is preferably embodied as a continuous extractive distillation column.

Further, the present invention reduces the solvent ratio in the extractive distillation columns, and also reduces a liquid load and a gas load of the extractive distillation columns. Accordingly, the liquid load and the gas load, or a treating load of the existing extractive distillation columns should be increased properly to maintain the tray efficiency and the separating effect thereof. Of course, on the other hand, reducing the solvent ratio means increasing a treating capability of the extractive distillation column.

The present invention can be further described by the following embodiments and contrast embodiments.

Embodiments 1-3 illustrate detailed and operative parameters in a first extractive distillation column of a butadiene extraction device according to the present invention, and contrast embodiment 1 illustrates parameters in the first extractive distillation column of the butadiene extraction device according to the prior art. A quality control index of the key component in the column top product obtained from the first extractive distillation column of the butadiene extraction device is 1,3-butadiene at no more than 0.3% wt, and a quality control index of the key component in the bottom product after exsolution thereof is cis-2-butene at no more than 4.5% wt. In the embodiments 1-3 and the contrast embodiment 1, the of trays is 242, and a separating assignment is equal. It's worth mentioning that, in the present invention, the light and heavy components are according to the volatility after adding the solvent, the light component is referring to the component rising up to be condensed in the upper portion of the column, and the heavy component is referring to the component absorbed by the solvent. Correspondingly, the heavy component is used as the index of the key light component to describe the quality of the light component condensed, and the light component is used as the index of the key heavy component to describe the quality of the heavy component separated.

Embodiments 4-6 illustrate detailed and operative parameters in a first extractive distillation column of a C5 separation device according to the present invention, and contrast embodiment 2 illustrates parameters in the first extractive distillation column of the C5 separation device according to the prior art. A quality control index of the key component in the column top product obtained from the first extractive distillation column of the C5 separation device is isoprene at no more than 1.0% wt, and a quality control index of the key component in the bottom product after exsolution thereof is 2-methyl-2-butene at no more than 0.5% wt. In the embodiments 4-6 and the contrast embodiment 2, the number of trays is 140, and a separating assignment is equal.

Embodiments 7-9 illustrate detailed and operative parameters in a second extractive distillation column of a C5 separation device according to the present invention, and contrast embodiment 3 illustrates parameters in the second extractive distillation column of the C5 separation device according to the prior art.

Embodiment 1

In the present embodiment, the feeding temperature of the solvent is 46° C., which is 3.5° C. higher than the top temperature 42.5° C., the feeding temperature of the mixture is 45° C., the mixture is fed as saturated liquid, and the solvent ratio is 6.5 wt/wt.

| Parameter | Value |
| --- | --- |
| Top pressure | 0.39 Mpa (gauge pressure) |
| Bottom pressure | 0.54 Mpa (gauge pressure) |
| Top product | 7580 kg/h |
| Recycled feed | 860 Nm³/h |
| Feeding mixture | 15540 kg/h |
| Feeding solvent | 101010 kg/h |
| Reflux | 10000 kg/h |
| Bottom temperature of column | 120° C. |
| Top temperature of column | 42.5° C. |
| Feeding temperature of solvent | 46° C. |
| Feeding temperature of mixture | 45° C. (saturated liquid) |
| Solvent ratio | 6.5 wt/wt |

Embodiment 2

In the present embodiment, the feeding temperature of the solvent is 54° C., which is 11.5° C. higher than the top temperature 42.5° C., the feeding temperature of the mixture is 45° C., the mixture is fed as saturated liquid, and the solvent ratio is 4.2 wt/wt.

| Parameter | Value |
| --- | --- |
| Top pressure | 0.39 Mpa (gauge pressure) |
| Bottom pressure | 0.52 Mpa (gauge pressure) |
| Top product | 8268 kg/h |
| Recycled feed | 600 Nm³/h |
| Feeding mixture | 16956 kg/h |
| Feeding solvent | 71215 kg/h |
| Reflux | 11000 kg/h |
| Bottom temperature of column | 106° C. |
| Top temperature of column | 42.5° C. |
| Feeding temperature of solvent | 54° C. |
| Feeding temperature of mixture | 45° C. (saturated liquid) |
| Solvent ratio | 4.2 wt/wt |

Embodiment 3

In the present embodiment, the feeding temperature of the solvent is 60° C., which is 17.5° C. higher than the top temperature 42.5° C., the feeding temperature of the mixture is 45° C., the mixture is fed as saturated liquid, and the solvent ratio is 6.2 wt/wt.

| Parameter | Value |
| --- | --- |
| Top pressure | 0.39 Mpa (gauge pressure) |
| Bottom pressure | 0.54 Mpa (gauge pressure) |
| Top product | 7580 kg/h |
| Recycled feed | 600 Nm³/h |
| Feeding mixture | 15540 kg/h |
| Feeding solvent | 96350 kg/h |
| Reflux | 12500 kg/h |
| Bottom temperature of column | 104° C. |
| Top temperature of column | 42.5° C. |
| Feeding temperature of solvent | 60° C. |
| Feeding temperature of mixture | 45° C. (saturated liquid) |
| Solvent ratio | 6.2 wt/wt |

Contrast Embodiment 1

In the present contrast embodiment, the feeding temperature of the solvent is 43° C., which is 0.5° C. higher than the top temperature 42.5° C., the feeding temperature of the mixture is 50° C., the mixture is fed as saturated vapor, and the solvent ratio is 8.0 wt/wt.

| Parameter | Value |
| --- | --- |
| Top pressure | 0.39 Mpa (gauge pressure) |
| Bottom pressure | 0.54 Mpa (gauge pressure) |
| Top product | 6890 kg/h |
| Recycled feed | 1860 Nm³/h |
| Feeding mixture | 14130 kg/h |
| Feeding solvent | 113200 kg/h |
| Reflux | 9200 kg/h |
| Bottom temperature of column | 130° C. |
| Top temperature of column | 42.5° C. |
| Feeding temperature of solvent | 43° C. |
| Feeding temperature of mixture | 50° C. (saturated vapor) |
| Solvent ratio | 8.0 wt/wt |

Referring to the parameters of the embodiments 1-3 and the contrast embodiment 1, adjusting the parameters of an existing first extractive distillation column of a butadiene extraction device according to the present invention, and especially increasing the feeding temperature of the solvent properly and feeding the mixture as saturated liquid reduces the solvent ratio and increases the treating capability thereof. Particularly, when the feeding temperature of the solvent is 11.5° C. higher than the top temperature 42.5° C., the solvent ratio decreases from 8.0 wt/wt to 4.2 wt/wt, and the treating capability increases from 14130 kg/h to 16956 kg/h.

Embodiment 4

In the present embodiment, the feeding temperature of the solvent is 48° C., which is 4° C. higher than the top temperature 44° C., the feeding temperature of the mixture is 56° C., the mixture is fed as saturated liquid, and the solvent ratio is 5.2 wt/wt.

| Parameter | Value |
| --- | --- |
| Top pressure | 0.04 Mpa (gauge pressure) |
| Bottom pressure | 0.13 Mpa (gauge pressure) |
| Top product | 1400 kg/h |
| Recycled feed | 800 kg/h |
| Feeding mixture | 3640 kg/h |
| Feeding solvent | 18930 kg/h |
| Reflux ratio | 3.6 |
| Reflux | 5000 kg/h |
| Bottom temperature of column | 120° C. |
| Top temperature of column | 44° C. |
| Feeding temperature of solvent | 48° C. |
| Feeding temperature of mixture | 56° C.(saturated liquid) |
| Solvent ratio | 5.2 wt/wt |

Embodiment 5

In the present embodiment, the feeding temperature of the solvent is 57° C., which is 13° C. higher than the top temperature 44° C., the feeding temperature of the mixture is 56° C., the mixture is fed as saturated liquid, and the solvent ratio is 4.0 wt/wt.

| Parameter | Value |
| --- | --- |
| Top pressure | 0.04 Mpa (gauge pressure) |
| Bottom pressure | 0.13 Mpa (gauge pressure) |
| Top product | 1800 kg/h |
| Recycled feed | 600 kg/h |
| Feeding mixture | 4550 kg/h |
| Feeding solvent | 18200 kg/h |
| Reflux ratio | 5.2 |
| Reflux | 9380 kg/h |
| Bottom temperature of column | 106° C. |
| Top temperature of column | 44° C. |
| Feeding temperature of solvent | 57° C. |
| Feeding temperature of mixture | 56° C. (saturated liquid) |
| Solvent ratio | 4.0 wt/wt |

Embodiment 6

In the present embodiment, the feeding temperature of the solvent is 61° C., which is 17° C. higher than the top temperature 44° C., the feeding temperature of the mixture is 56° C., the mixture is fed as saturated liquid, and the solvent ratio is 5.4 wt/wt.

| Parameter | Value |
| --- | --- |
| Top pressure | 0.04 Mpa (gauge pressure) |
| Bottom pressure | 0.13 Mpa (gauge pressure) |
| Top product | 1600 kg/h |
| Recycled feed | 700 kg/h |
| Feeding mixture | 4030 kg/h |
| Feeding solvent | 21720 kg/h |
| Reflux ratio | 7.1 |
| Reflux | 11420 kg/h |
| Bottom temperature of column | 106° C. |
| Top temperature of column | 44° C. |
| Feeding temperature of solvent | 61° C. |
| Feeding temperature of mixture | 56° C. (saturated liquid) |
| Solvent ratio | 5.4 wt/wt |

Contrast Embodiment 2

In the present contrast embodiment, the feeding temperature of the solvent is 64° C., which is 20° C. higher than the top temperature 44° C., the feeding temperature of the mixture is 74° C., the mixture is fed after mixing with hot solvent having a flow rate which is 0.7~1.5 times of the mixture, and the solvent ratio is 8.6 wt/wt.

| Parameter | Value |
| --- | --- |
| Top pressure | 0.04 Mpa (gauge pressure) |
| Bottom pressure | 0.14 Mpa (gauge pressure) |
| Top product | 833 kg/h |
| Recycled feed | 1841 kg/h |
| Feeding mixture | 2106 kg/h |
| Feeding solvent | 18096.5 kg/h |
| Reflux ratio | 6.6 |
| Reflux | 5494.9 kg/h |
| Bottom temperature of column | 134° C. |
| Top temperature of column | 44° C. |
| Feeding temperature of solvent | 64° C. |
| Feeding temperature of mixture after mixing with hot solvent | 74° C. |
| Solvent ratio | 8.6 wt/wt |

Referring to the parameters of the embodiments 4-6 and the contrast embodiment 2, adjusting the parameters of an existing first extractive distillation column of the C5 extraction device according to the present invention, and especially increasing the feeding temperature of the solvent properly and feeding the mixture as saturated liquid reduces the solvent ratio and increases the treating capability thereof. Particularly, when the feeding temperature of the solvent is 13° C. higher than the top temperature 44° C., the solvent ratio decreases from 8.6 wt/wt to 4.0 wt/wt, and the treating capability increases from 2106 kg/h to 4550 kg/h.

Contrasting with the prior art, simply increasing the feeding temperature of the solvent and feeding the mixture as liquid based on the traditional theory can not reduce the solvent ratio in the first extractive distillation column of the C5 extraction device, but ask for more heat and larger solvent ratio. The present invention discloses the detailed and operative parameters by plenty of experiments and continuous practice based on the new theory. The parameters according to the present invention reduce the solvent ratio on the existing equipments and devices. Additionally, the prior art mixes the mixture with the hot solvent by a proportion of 1:0.7~1.5 by flow rate. The present invention does not need mixing the mixture with the hot solvent, so as to further reduce the solvent ratio.

Embodiment 7

In the present embodiment, the feeding temperature of the solvent is 48° C., which is 4° C. higher than the top temperature 44° C., the feeding temperature of the mixture is 58° C., the mixture is fed as saturated liquid, and the solvent ratio is 6.5 wt/wt.

| Parameter | Value |
| --- | --- |
| Top pressure | 0.04 Mpa (gauge pressure) |
| Bottom pressure | 0.14 Mpa (gauge pressure) |
| Top product | 670 kg/hr |
| Recycled feed | 350 kg/hr |
| Feeding mixture | 680 kg/hr |
| Feeding solvent | 4420 kg/hr |
| Reflux ratio | 2.0 |
| Reflux | 1340 kg/hr |
| Bottom temperature of column | 134° C. |
| Top temperature of column | 44° C. |
| Feeding temperature of solvent | 48° C. |
| Feeding temperature of mixture | 58° C. (saturated liquid) |
| Solvent ratio | 6.5 wt./wt. |

Embodiment 8

In the present embodiment, the feeding temperature of the solvent is 56° C., which is 11° C. higher than the top temperature 44° C., the feeding temperature of the mixture is 58° C., the mixture is fed as saturated liquid, and the solvent ratio is 5.0 wt/wt.

| Parameter | Value |
| --- | --- |
| Top pressure | 0.04 Mpa (gauge pressure) |
| Bottom pressure | 0.14 Mpa (gauge pressure) |
| Top product | 670 kg/hr |
| Recycled feed | 350 kg/hr |
| Feeding mixture | 680 kg/hr |
| Feeding solvent | 3400 kg/hr |
| Reflux ratio | 2.99 |
| Reflux | 2000 kg/hr |
| Bottom temperature of column | 134° C. |
| Top temperature of column | 44° C. |
| Feeding temperature of solvent | 48° C. |
| Feeding temperature of mixture | 58° C. (saturated liquid) |
| Solvent ratio | 5.0 wt./wt. |

Embodiment 9

In the present embodiment, the feeding temperature of the solvent is 65° C., which is 21° C. higher than the top temperature 44° C., the feeding temperature of the mixture is 58° C., the mixture is fed as saturated liquid, and the solvent ratio is 6.8 wt/wt.

| Parameter | Value |
| --- | --- |
| Top pressure | 0.04 Mpa (gauge pressure) |
| Bottom pressure | 0.14 Mpa (gauge pressure) |
| Top product | 670 kg/hr |
| Recycled feed | 350 kg/hr |
| Feeding mixture | 680 kg/hr |
| Feeding solvent | 4624 kg/hr |
| Reflux ratio | 3.43 |
| Reflux | 2300 kg/hr |
| Bottom temperature of column | 134° C. |
| Top temperature of column | 44° C. |
| Feeding temperature of solvent | 48° C. |
| Feeding temperature of mixture | 58° C. (saturated liquid) |
| Solvent ratio | 6.8 wt./wt. |

Contrast Embodiment 3

In the present contrast embodiment, the feeding temperature of the solvent is 64° C., which is 20° C. higher than the top temperature 44° C., the feeding temperature of the mixture is 74° C., the mixture is fed after mixing with hot solvent having a flow rate which is 0.7~1.5 times of the mixture, and the solvent ratio is 9.9 wt/wt.

| Parameter | Value |
| --- | --- |
| Top pressure | 0.04 Mpa (gauge pressure) |
| Bottom pressure | 0.14 Mpa (gauge pressure) |
| Top product | 498.58 kg/hr |
| Recycled feed | 970 kg/hr |
| Feeding mixture | 504.07 kg/hr |
| Feeding solvent | 4996.9 kg/hr |
| Reflux ratio | 2742.19 kg/hr |
| Reflux | 5.5 |
| Bottom temperature of column | 134° C. |
| Top temperature of column | 44° C. |
| Feeding temperature of solvent | 64° C. |
| Feeding temperature of mixture after mixing with hot solvent | 74° C. |
| Solvent ratio | 9.9 wt./wt. |

Referring to the parameters of the embodiments 7-9 and the contrast embodiment 3, adjusting the parameters of an existing second extractive distillation column of the C5 extraction device according to the present invention, and especially increasing the feeding temperature of the solvent properly and feeding the mixture as saturated liquid reduces the solvent ratio and increases the treating capability thereof. Particularly, when the feeding temperature of the solvent is 11° C. higher than the top temperature 44° C., the solvent ratio decreases from 9.9 wt/wt to 5.0 wt/wt, and the treating capability increases from 504.07 kg/h to 680 kg/h.

Contrasting with the prior art, simply increasing the feeding temperature of the solvent and feeding the mixture as liquid based on the traditional theory can not reduce the solvent ratio in the second extractive distillation column of the C5 extraction device, but ask for more heat and larger solvent ratio. The present invention discloses the detailed and operative parameters by plenty of experiments and continuous practice based on the new theory. The parameters according to the present invention reduce the solvent ratio on the existing equipments and devices. Additionally, the prior art mixes the mixture with the hot solvent by a proportion of 1:0.7~1.5 by flow rate. The present invention does not need mixing the mixture with the solvent, so as to further reduce the solvent ratio.

One skilled in the art will understand that the embodiments of the present invention described above are exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A process for extractive distillation, comprising:
    feeding a solvent to an extractive distillation column via a solvent feeding inlet thereof, the column having several recycling trays between the solvent feeding inlet and a top of the column, wherein the solvent has a feeding temperature 3.5 to 22.5° C. higher than a top temperature of the extractive distillation column;
    feeding a mixture comprising a light component and a heavy component to the extractive distillation column via a mixture feeding inlet thereof, wherein the mixture is liquid, and the mixture feeding inlet is lower than the solvent feeding inlet, in such a manner that a solvent ratio of the extractive distillation column is reduced;
    condensing a vapor generated by the mixture in an upper portion of the extractive distillation column to obtain the light component; and
    separating the solvent in a lower portion of the extractive distillation column to obtain the heavy component.

2. The process of claim 1, further comprising:
    recycling the solvent from the lower portion of the extractive distillation column, wherein the solvent is recycled and fed to the extractive distillation column via the solvent feeding inlet; and
    recycling a part of the light component in the upper portion of the extractive distillation column to form an external reflux.

3. The process of claim 1, wherein the mixture is saturated liquid.

4. The process of claim 2, wherein the mixture is saturated liquid.

5. The process of claim 1, wherein the feeding temperature of the solvent is 3.5 to 18.5° C. higher than the top temperature of the extractive distillation column.

6. The process of claim 2, wherein the feeding temperature of the solvent is 3.5 to 18.5° C. higher than the top temperature of the extractive distillation column.

7. The process of claim 1, wherein the feeding temperature of the solvent is 7.5 to 18.5° C. higher than the top temperature of the extractive distillation column.

8. The process of claim 3, wherein the feeding temperature of the solvent is 7.5 to 18.5° C. higher than the top temperature of the extractive distillation column.

9. The process of claim 4, wherein the feeding temperature of the solvent is 7.5 to 18.5° C. higher than the top temperature of the extractive distillation column.

10. The process of claim 7, wherein the extractive distillation column is a first extractive distillation column of a butadiene extraction device, and the feeding temperature of the solvent is more 10.5 to 15.5° C. higher than the top temperature of the extractive distillation column.

11. The process of claim 8, wherein the extractive distillation column is a first extractive distillation column of a butadiene extraction device, and the feeding temperature of the solvent is more 10.5 to 15.5° C. higher than the top temperature of the extractive distillation column.

12. The process of claim 9, wherein the extractive distillation column is a first extractive distillation column of a butadiene extraction device, and the feeding temperature of the solvent is 10.5 to 15.5° C. higher than the top temperature of the extractive distillation column.

13. The process of claim 7, wherein the extractive distillation column is a first extractive distillation column of a C5 separation device, and the feeding temperature of the solvent is 9.5 to 14.5° C. higher than the top temperature of the extractive distillation column.

14. The process of claim 8, wherein the extractive distillation column is a first extractive distillation column of a C5 separation device, and the feeding temperature of the solvent is 9.5 to 14.5° C. higher than the top temperature of the extractive distillation column.

15. The process of claim 9, wherein the extractive distillation column is a first extractive distillation column of a C5 separation device, and the feeding temperature of the solvent is 9.5 to 14.5° C. higher than the top temperature of the extractive distillation column.

16. The process of claim 7, wherein the extractive distillation column is a second extractive distillation column of a C5 separation device, and the feeding temperature of the solvent is 11.5 to 16.5° C. higher than the top temperature of the extractive distillation column.

17. The process of claim 8, wherein the extractive distillation column is a second extractive distillation column of a C5 separation device, and the feeding temperature of the solvent is 11.5 to 16.5° C. higher than the top temperature of the extractive distillation column.

18. The process of claim 9, wherein the extractive distillation column is a second extractive distillation column of a C5 separation device, and the feeding temperature of the solvent is 11.5 to 16.5° C. higher than the top temperature of the extractive distillation column.

19. The process of claim 1, wherein the extractive distillation is a continuous extractive distillation column.

20. The process of claim 9, wherein the extractive distillation is a continuous extractive distillation column.

* * * * *